(12) United States Patent
Leys et al.

(10) Patent No.: US 12,135,108 B2
(45) Date of Patent: Nov. 5, 2024

(54) ELECTROSTATIC DISCHARGE MITIGATION TUBING

(71) Applicant: ENTEGRIS, INC., Billerica, MA (US)

(72) Inventors: John Leys, Chaska, MN (US); Barry L. Gregerson, Excelsior, MN (US)

(73) Assignee: ENTEGRIS, INC., Billerica, MA (US)

( * ) Notice: Subject to any disclaimer, the term of this patent is extended or adjusted under 35 U.S.C. 154(b) by 287 days.

(21) Appl. No.: 17/613,359

(22) PCT Filed: May 12, 2020

(86) PCT No.: PCT/US2020/032417
§ 371 (c)(1),
(2) Date: Nov. 22, 2021

(87) PCT Pub. No.: WO2020/236454
PCT Pub. Date: Nov. 26, 2020

(65) Prior Publication Data
US 2022/0221086 A1    Jul. 14, 2022

Related U.S. Application Data

(60) Provisional application No. 62/851,962, filed on May 23, 2019.

(51) Int. Cl.
| | | |
|---|---|---|
| *F16L 9/14* | (2006.01) | |
| *B32B 1/08* | (2006.01) | |
| *B32B 3/26* | (2006.01) | |
| *B32B 5/18* | (2006.01) | |
| *B32B 15/085* | (2006.01) | |
| *B32B 27/08* | (2006.01) | |
| *B32B 27/20* | (2006.01) | |
| *B32B 27/32* | (2006.01) | |
| *F16L 41/02* | (2006.01) | |
| *H05F 1/00* | (2006.01) | |

(52) U.S. Cl.
CPC ........ *F16L 9/14* (2013.01); *B32B 1/08* (2013.01); *B32B 3/266* (2013.01); *B32B 5/18* (2013.01); *B32B 15/085* (2013.01); *B32B 27/08* (2013.01); *B32B 27/20* (2013.01); *B32B 27/322* (2013.01); *F16L 41/02* (2013.01); *H05F 1/00* (2013.01); *B32B 2307/202* (2013.01); *B32B 2597/00* (2013.01)

(58) Field of Classification Search
CPC ............. F16L 9/14; F16L 9/125; F16L 11/127
USPC ......................... 138/137, 140, 141; 428/36.9
See application file for complete search history.

(56) References Cited

U.S. PATENT DOCUMENTS

| | | | |
|---|---|---|---|
| 2,347,897 A | 5/1944 | Febrey | |
| 3,465,111 A | 9/1969 | Breslin | |
| 3,753,205 A | 8/1973 | Tuger | |

(Continued)

FOREIGN PATENT DOCUMENTS

| | | |
|---|---|---|
| CH | 707521 A2 | 7/2014 |
| CN | 201362369 Y | 12/2009 |

(Continued)

*Primary Examiner* — Patrick F Brinson

(57) ABSTRACT

An electrostatic discharge tubing segment includes a porous non-conductive interior surface and an adjacent conductive polymer portion. The conductive polymer portion is configured to transfer electrostatic charge generated by a charged fluid passing through the tubing segment to ground such that electrostatic discharge can be mitigated.

13 Claims, 9 Drawing Sheets

(56) References Cited

U.S. PATENT DOCUMENTS

| | | |
|---|---|---|
| 3,914,002 A | 10/1975 | Berliner et al. |
| 4,120,325 A | 10/1978 | de Putter |
| 4,127,840 A | 11/1978 | House |
| 4,215,384 A | 7/1980 | Elson |
| 4,312,383 A | 1/1982 | Kleykamp |
| 4,368,348 A | 1/1983 | Eichelberger et al. |
| 4,675,780 A | 6/1987 | Barnes et al. |
| 4,854,887 A | 8/1989 | Blandin |
| 4,953,636 A | 9/1990 | Mohn |
| 5,000,875 A | 3/1991 | Kolouch |
| 5,154,453 A | 10/1992 | Nishio |
| 5,381,511 A * | 1/1995 | Bahar .................. F16L 53/38 138/104 |
| 5,506,047 A | 4/1996 | Hedrick et al. |
| 5,672,832 A | 9/1997 | Cucci et al. |
| 5,678,435 A | 10/1997 | Hodson |
| 5,869,766 A | 2/1999 | Cucci et al. |
| 5,957,713 A | 9/1999 | Engle et al. |
| 5,958,532 A | 9/1999 | Krause et al. |
| 6,012,336 A | 1/2000 | Eaton et al. |
| 6,179,132 B1 | 1/2001 | Moya |
| 6,202,701 B1 | 3/2001 | Gobl |
| 6,409,222 B1 | 6/2002 | Donoho et al. |
| 6,412,832 B1 | 7/2002 | Donoho et al. |
| 6,428,729 B1 | 8/2002 | Bhatt et al. |
| 6,595,240 B2 | 7/2003 | Leys et al. |
| 6,601,879 B2 | 8/2003 | Donoho et al. |
| 6,612,175 B1 | 9/2003 | Peterson et al. |
| 6,652,008 B2 | 11/2003 | Fischer et al. |
| 6,758,104 B2 | 7/2004 | Leys et al. |
| 6,776,440 B2 | 8/2004 | Nishio |
| 6,789,781 B2 | 9/2004 | Johnson et al. |
| 7,063,304 B2 | 6/2006 | Leys |
| 7,308,932 B2 | 12/2007 | Poh et al. |
| 7,347,937 B1 | 3/2008 | Cheng et al. |
| 7,383,967 B2 | 6/2008 | Gibson |
| 7,690,692 B2 | 4/2010 | Athalye et al. |
| 7,833,419 B2 | 11/2010 | Doucoure et al. |
| 8,561,855 B2 | 10/2013 | Hennen et al. |
| 8,689,817 B2 | 4/2014 | Leys et al. |
| 8,726,935 B2 | 5/2014 | Leys |
| 2001/0046111 A1 | 11/2001 | Koike et al. |
| 2002/0150711 A1 | 10/2002 | Schulz et al. |
| 2003/0021929 A1* | 1/2003 | Takahashi ............. F16L 9/125 428/36.9 |
| 2004/0025520 A1* | 2/2004 | Robbie ................ F16L 59/141 62/50.7 |
| 2004/0245169 A1 | 12/2004 | Breusch |
| 2005/0236110 A1 | 10/2005 | Bhatt et al. |
| 2006/0035043 A1 | 2/2006 | Sato |
| 2006/0099843 A1 | 5/2006 | Fullner et al. |
| 2006/0125233 A1 | 6/2006 | Cantrell et al. |
| 2007/0144756 A1 | 6/2007 | Wenger et al. |
| 2008/0102660 A1 | 5/2008 | Wittwer |
| 2010/0018925 A1 | 1/2010 | Doucoure et al. |
| 2014/0202946 A1 | 7/2014 | Asami et al. |
| 2015/0260315 A1* | 9/2015 | Van Hooren ........... F16L 11/20 427/105 |
| 2017/0003256 A1 | 1/2017 | Ziegler et al. |
| 2019/0091617 A1 | 3/2019 | Jaber et al. |
| 2019/0337823 A1 | 11/2019 | Leys et al. |
| 2020/0103056 A1* | 4/2020 | Puglia .................. B32B 27/08 |
| 2021/0071788 A1 | 3/2021 | Linder et al. |

FOREIGN PATENT DOCUMENTS

| | | |
|---|---|---|
| CN | 102142430 A | 8/2011 |
| CN | 104500873 A | 4/2015 |
| CN | 205244650 U | 5/2016 |
| CN | 205261118 U | 5/2016 |
| CN | 105793703 A | 7/2016 |
| CN | 103982338 A | 5/2017 |
| CN | 206175842 U | 5/2017 |
| CN | 107061880 A | 8/2017 |
| DE | 20119778 U1 | 3/2002 |
| DE | 202010017917 U1 | 4/2013 |
| DE | 102012112563 A1 | 6/2013 |
| DE | 102016109967 A1 | 11/2017 |
| EP | 0160168 A2 | 12/1986 |
| EP | 0723143 A1 | 7/1996 |
| EP | 0617745 B1 | 2/1998 |
| EP | 1191268 B1 | 12/2003 |
| EP | 2273174 A2 | 1/2011 |
| EP | 2500393 A1 | 9/2012 |
| JP | S6217486 A | 1/1987 |
| JP | H03172739 A | 7/1991 |
| JP | H06249380 A | 9/1994 |
| JP | 2000291848 A | 10/2000 |
| JP | 3126448 B2 | 1/2001 |
| JP | 2002081580 A | 3/2002 |
| JP | 2003278972 A | 10/2003 |
| JP | 2006269677 A | 10/2006 |
| JP | 2007236648 A | 9/2007 |
| JP | 2008082459 A | 4/2008 |
| JP | 4439889 B2 | 3/2010 |
| JP | 2016121792 A | 7/2016 |
| JP | 2016183697 A | 10/2016 |
| JP | 2018015751 A | 2/2018 |
| TW | M522298 U | 5/2016 |
| WO | 1993012281 A1 | 6/1993 |
| WO | 1997015375 A1 | 5/1997 |
| WO | 2004104465 A2 | 12/2004 |
| WO | 2006017147 A2 | 2/2006 |
| WO | 2017210291 A2 | 12/2017 |
| WO | 2017210293 A1 | 12/2017 |

* cited by examiner

ELECTROSTATIC DISCHARGE MITIGATION TUBING

CROSS-REFERENCE TO RELATED APPLICATION

This application is a 371 National Phase Entry Application of International Application No. PCT/US2020/032417, filed May 12, 2020, which in turns claims priority to and the benefit of U.S. Provisional Application No. 62/851,962 filed, May 23, 2019, the entireties of which is incorporated herein by reference for all purposes.

TECHNICAL FIELD

Embodiments of the disclosure are directed electrostatic discharge (ESD) mitigation tubing that may be used, for example, in fluid handling systems, and more specifically, for use in ultra-pure fluid handling systems needing electrostatic discharge mitigation.

BACKGROUND

Fluid handling systems offering high purity standards have many uses in advanced technology applications. These applications include processing and manufacturing of solar panels, flat panel displays, and in the semiconductor industry for applications such as photolithography, bulk chemical delivery, chemical mechanical polishing (CMP), wet etch, and cleaning. Certain chemicals used in these applications are particularly corrosive, precluding the use of some conventional fluid handling technology because of possible corrosion of the fluid handling components and leaching of chemicals into the environment.

In order to meet the corrosion resistance and purity requirements for such applications, fluid handling systems provide tubing, fittings, valves, and other elements, that are made from inert polymers. These inert polymers may include, but are not limited to, fluoropolymers such as tetrafluoroethylene polymer (PTFE), perfluoroalkoxy alkane polymer (PFA), ethylene and tetrafluoroethylene polymer (ETFE), ethylene tetrafluoroethylene and hexafluoropropylene polymer (EFEP), and fluorinated ethylene propylene polymer (FEP). In addition to providing a non-corrosive and inert construction, many fluoropolymers, such as PFA, are injection moldable and extrudable. Several types of connector fittings, made from such polymers, are available and are known, such as PRIMELOCK® fittings, PILLAR® fittings, flared fittings, and other fittings. Exemplary fittings, for example, are illustrated in U.S. Pat. Nos. 5,154,453; 6,409,222; 6,412,832; 6,601,879; 6,758,104; and 6,776,440.

Electrostatic discharge (ESD) is an important technical issue for fluid handling systems in the semiconductor industry and in other technology applications. Frictional contact between fluids and surfaces of various operational components (e.g. tubing or piping, valves, fittings, filters, etc.) in the fluid system can result in generation and buildup of static electrical charges. The extent of charge generation depends on various factors including, but not limited to, the nature of the components and the fluid, fluid velocity, fluid viscosity, electrical conductivity of the fluid, pathways to ground, turbulence and shear in liquids, presence of air in the fluid, and surface area. These properties, and ways to mitigate the undesired static electrical charge caused by these properties, are discussed and reported in NFPA 77, "Recommended Practice on Static Electricity", pp. 77-1 to 77-67, 2014.

Further, as the fluid flows through the system, the charge can be carried downstream in a phenomenon called a streaming charge, where charge may buildup beyond where the charge originated. Sufficient charge accumulations can cause ESD at the tubing or pipe walls, component surfaces, or even onto substrates or wafers at various process steps.

In some applications, semiconductor substrates or wafers are highly sensitive to static electrical charges and such ESD can result in damage or destruction of the substrate or wafer. For example, circuits on the substrate can be destroyed and photoactive compounds can be activated prior to regular exposure due to uncontrolled ESD. Additionally, built up static charge can discharge from within the fluid handling system to the exterior environment, potentially damaging components in the fluid handling system (e.g. tubing or piping, fittings, components, containers, filters, etc.), that may lead to leaks, spills of fluid in the system, and diminished performance of components. In these situations, such discharge, may lead to potential fire or explosion when flammable, toxic and/or corrosive fluids are used in the compromised fluid handling system.

It is desirable to improve ESD mitigation in ultra-pure fluid handling systems for improved component performance and reduction in potentially damaging ESD events.

SUMMARY

One or more embodiments of this disclosure are related to electrostatic discharge (ESD) mitigation tubing. In one or more embodiments, the electrostatic discharge (ESD) mitigation tubing includes a porous, non-conductive polymer interior surface and an adjacent conductive polymer that transfers electrostatic charge to ground from a charged fluid passing through the tubing.

In some embodiments, the porous interior surface is foam layer, a perforated layer, a layer comprising apertures, or a layer comprising charge transfer conduits. In these embodiments, the porous interior surface comprises apertures, holes, channels, fluid passages, charge transfer conduits, or other types of porosity, apertures or perforations.

In certain embodiments, the porous, non-conductive polymer interior surface is a perforated layer of non-conductive polymer on the interior surface of a conductive polymer tubing.

In some embodiments, the non-conductive polymer is a fluoropolymer, and the conductive polymer is a conductive perfluoropolymer.

In other embodiments, the ESD mitigation tubing further comprises an outer layer of a fluoropolymer.

In some embodiments, the porous, non-conductive polymer interior surface is a non-conductive polymer tubing and the conductive polymer comprises one or more stripes of conductive polymer disposed between an interior surface and an exterior surface of the non-conductive polymer tubing that transfers electrostatic charge to ground from a charged fluid passing through the tubing. In certain embodiments, the ESD mitigation tubing includes a conductive polymer outer layer in charge transfer contact with the one or more stripes of conductive poly mer. In these embodiments, the stripes may be linear axial stripes, nonlinear axial stripes, spiral stripes, helical stripes, or other geometries. In these embodiments, the conductive stripes are conductive fluoropolymer stripes.

One or more embodiments of the disclosure include a method of dissipating electrostatic charge with the disclosed ESD mitigation tubing comprising passing a fluid through an interior passage of a tubing segment including a non-conductive, porous interior surface and an adjacent conductive portion and transferring electrostatic charge from the tubing segment to ground via the conductive portion.

Other embodiments of the disclosure include a fluid circuit for a predetermined fluid flow passageway having at least one inlet and at least one outlet, the fluid circuit including a plurality of ESD mitigation tubing segments of any of embodiments described herein and a plurality of operative components. Each operative component includes a body portion with an internal fluid flow passageway and a plurality of tubing connector fittings. Each operative component is connected to each of the plurality of tubing segments at selected tubing connector fittings, the plurality of tubing segments and operative components providing the fluid flow passageway through the fluid circuit. Each tubing segment includes: i) a non-conductive polymer portion defining the fluid passageway; and ii) an one or more conductive portions of conductive fluoropolymer extending axially to ends of each of the respective tubing segments. Each operative component body portion includes a conductive fluoropolymer that extends between each of the plurality of tubing connector fittings, wherein each of the tubing connector fittings conductively connects the respective conductor of the body portion to the one or more conductive portions of the tubing segment. In these embodiments, the plurality of operative components includes any one of a valve, a straight connector, a T-connector, an elbow connector, a multi-connector manifold, a filter, a heat exchanger, a purifier, a degasser, or a sensor, but not limited to these.

In certain embodiments, this disclosure provides a fluid circuit for a predetermined fluid flow passageway (such as gases or liquids, or both) having at least one inlet and at least one outlet, the fluid circuit comprising a plurality of tubing segments and a plurality of operative components, each operative component comprising a body portion with an internal fluid flow passageway and a plurality of tubing connector fittings, the operative components connecting the plurality of tubing segments at selected tubing connector fittings, the plurality of tubing segments and operative components providing the fluid flow passageway through the fluid circuit; wherein each tubing segment comprises i) a non-conductive polymer portion defining the fluid passageway and ii) one or more conductive fluoropolymer portion extending axially to ends of each of the respective tubing segments, wherein each operative component body portion comprises a conductive fluoropolymer that extends between each of the plurality of tubing connector fittings, and wherein each of the tubing connector fittings conductively connect the respective conductor of the body portion to the conductive fluoropolymer portions of the tubing segment.

Other disclosed embodiments include methods of making an electrostatic discharge mitigation fluid circuit for a predetermined fluid flow passageway having at least one inlet and at least one outlet comprising conductively connecting a plurality of tubing segments to a plurality of operative components, each operative component comprising a body portion with an internal fluid flow passageway and a plurality of tubing connector fittings, the operative components connecting the plurality of tubing segments at selected tubing connector fittings, the plurality of tubing segments and operative components providing the fluid flow passageway through the fluid circuit; wherein each tubing segment comprises i) a non-conductive polymer portion defining the fluid passageway and ii) an one or more conductive portions of conductive fluoropolymer that is bonded to and uniform with the non-conductive polymer portion extending axially to ends of each of the respective tubing segments, wherein each body portion comprises an conductive fluoropolymer that extends between each of the plurality of tubing connector fittings, and wherein each of the tubing connector fittings conductively connects the respective conductor of the body portion to the at least one conductive fluoropolymer portion of the tubing segment, and connecting the electrostatic discharge mitigation fluid circuit to ground.

In various embodiments, to provide a conductive pathway and fluid passageway through the fluid circuit, the operative components are connected by one or more tubing segments that connect to the components at their respective tubing connector fittings. Suitable operative components include, for example, valves, straight connectors, T-connectors, elbow connectors, multi-connector manifolds, filters, heat exchangers, purifiers, degassers, or sensors, but not limited to these. Suitable sensors may include, for example, flow controllers, regulators, flow meters, pressure meters, or variable area meters. In one or more embodiments, the body portion of the operative components may be bonded to and uniform with a conductive portion extending between the connector fittings and the fluid flow passageway.

In certain embodiments, the plurality of tubing segments each include a non-conductive polymer portion and one or more conductive fluoropolymer portions extending axially with the non-conductive polymer tubing portion. The portions of conductive fluoropolymer of the tubing segment conductively connect to the conductive pathway of the body portion at the tubing connector fittings.

The above summary is not intended to describe each illustrated embodiment or every implementation of the disclosure.

BRIEF DESCRIPTION OF THE DRAWINGS

The drawings included in this disclosure illustrate embodiments of the disclosure and, along with the description, serve to explain the principles of the disclosure. The drawings are only illustrative of certain embodiments and do not limit the disclosure.

Figure 1:
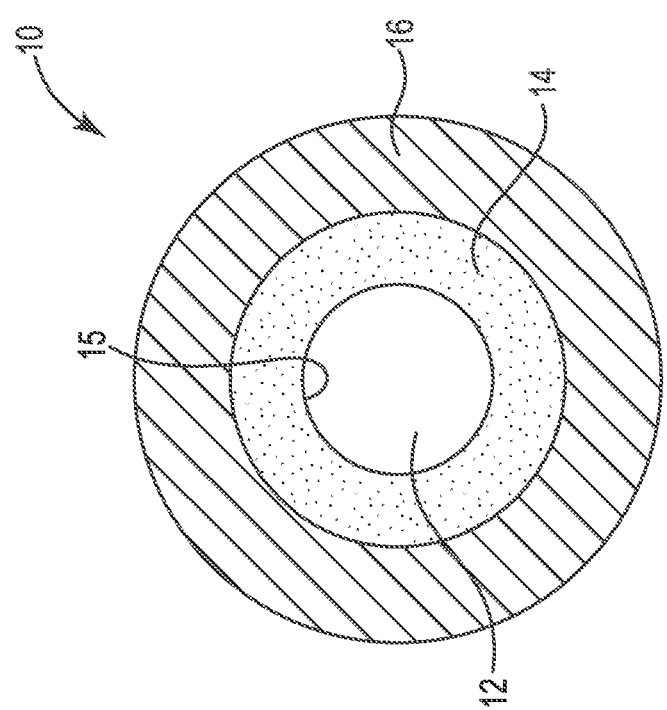
FIG. 1 is a cross-sectional view of an ESD mitigation tubing having a porous, non-conductive polymer interior surface and adjacent conductive polymer of this disclosure.

The embodiments of this disclosure are amenable to various modifications and alternative forms, and certain specifics have been shown, for example, in the drawings and will be described in detail. It is understood that the intention is not to limit the disclosure to the particular embodiments described; the intention is to cover all modifications, equivalents, and alternatives falling within the spirit and scope of this disclosure.

DETAILED DESCRIPTION

This disclosure reports embodiments of electrostatic discharge (ESD) mitigation tubing for use with a fluid handling system having a fluid flow passageway from a fluid supply to one or more downstream process stages. Embodiments of this system include a fluid circuit including conductively connected operative components and ESD mitigation tubing segments. Conventional and some ESD mitigation fluid circuits are reported, for example, in International patent application, WO 2017/210293, which is incorporated herein by reference, except for express definitions or patent claims contained therein.

ESD Mitigation Tubing

Tubing segments in this disclosure typically refer to any flexible or inflexible pipe or tube that is suitable for containing or transporting fluid. According to various embodiments, tubing segments are conductive, providing a conductive pathway along the length of each tubing segment in the fluid circuit. Conductive tubing may be constructed from materials including certain metals; polymeric material filled with a conductive material referred to herein as filled polymers; or intrinsically conducting polymers (ICPs). A filled polymer includes a polymer that is filled with a solid conductive material including, but not limited to steel wire, aluminum flakes, nickel coated graphite, carbon fiber, carbon powder, carbon nanotubes, or other conductive material.

In some instances, the tubing segments are partially conductive. The partially conductive tubing segments can include a main portion constructed from non-conductive or low conductive material and a secondary portion constructed from a conductive material such as disclosed above. Exemplary non-conductive or low conductive materials suitable for the tubing segments include various hydrocarbon and non-hydrocarbon polymers such as, but not limited to, polyesters, polycarbonates, polyamides, polyimides, poly urethanes, polyolefins, polystyrenes, polyesters, polycarbonates, polyketones, polyureas, polyvinyl resins, polyacrylates, polymethylacrylates and fluoropolymers. In some embodiments, the non-conductive or low conductive material is a fluoropolymer. Exemplary fluoropolymers include, but are not limited to, perfluoroalkoxy alkane polymer (PFA), ethylene tetrafluoroethylene polymer (ETFE), ethylene tetrafluoroethylene and hexafluoropropylene polymer (EFEP), fluorinated ethylene propylene polymer (FEP), tetrafluoroethylene polymer (PTFE), polychlorotrifluoroethylene (PCTFE), or other suitable polymeric materials. In one embodiment, the fluoropolymer is perfluoroalkoxy alkane polymer (PFA).

FIG. 1 is a cross-sectional view of an ESD mitigation tubing segment 10 defining an interior fluid passageway 12 and including a main non-conductive or low conductive portion 14, and secondary, conductive portion 16 adjacent to the main portion 14. In various embodiments the main non-conductive or low conductive portion 14 can include a porous, non-conductive polymer interior surface 15. In some embodiments, the porous, non-conductive interior surface 15 of the main portion 14 is a foam layer, a perforated layer, a layer comprising apertures, or a layer comprising charge transfer conduits. In some embodiments, the main portion 14 can be formed from a fluoropolymer. For example, in one embodiment, the main portion 14 can be formed from perfluoroalkoxy alkane (PFA). The secondary, conductive portion 16 can be bonded to and uniform with an outer surface 17 of the main portion 14, and can be constructed from a conductive polymeric material such as those conductive materials described herein. In some embodiments, the secondary, conductive portion 16 is constructed from a fluoropolymer filed with a conductive material and, more particularly, in certain embodiments, a PFA filled with a conductive material. The conductive material used to fill the PFA includes, but is not limited to, carbon fiber, with nickel coated graphite, carbon fiber, carbon powder, carbon nanotubes, metal particles, and steel fiber. The conductive portion 16 can provide a conductive pathway extending between each of the tubing connector fittings described below. Selecting the same polymeric material for the main portion 14 and the conductive portion 16 facilitates bonding between the two portions. However, it is also envisioned that different polymeric materials can be used to form each of the portions 14, 16 of the tubing segment 10.

According to one embodiment of making the tubing segment 10, a conductive perfluoroalkoxy alkane (PFA) polymer tubing is first extruded with an interior non-conductive fluoropolymer surface. A metal grounding rod is then placed in the interior fluid passageway and a high frequency static generator is attached to the ground rod and an electrostatic discharge is produced at the tip of the grounding rod. The electrostatic discharge generates very round, clean-edged holes in the non-conductive fluoropolymer surface that provided a porous interior non-conductive surface and an adjacent conductive polymer that transfers electrostatic charge to ground from a charged fluid passing through the tubing.

Figure 2:
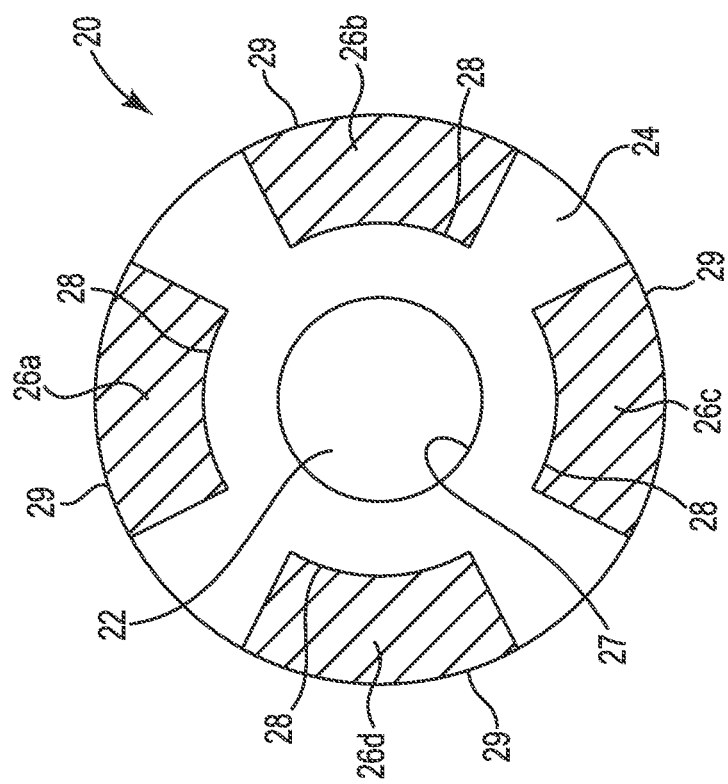
FIG. 2 is a cross-sectional view of an ESD mitigation tubing having a porous non-conductive section and conductive polymer stripes of this disclosure.

FIG. 2 is a cross-sectional view of an ESD mitigation tubing segment 20 according to another exemplary embodiment of the disclosure. The tubing segment 20 shown in FIG. 2 is partially conductive. Tubing segment 20 defines an interior fluid passageway 22 and includes a non-conductive portion 24 and a conductive portion 26 defined by a plurality of conductive polymer stripes 26a, 26b, 26c and 26d, collectively "26" extending along a length of the tubing segment 20 in a direction along its longitudinal axis. It is generally understood that the number of conductive polymer stripes can vary. The spacing between the conductive polymer stripes may also vary. In some embodiments, the non-conductive portion 24 is at least partially porous and defines a porous, non-conductive interior surface 27 of the tubing segment 20. The conductive polymer stripes 26a, 26b, 26c and 26d defining the conductive portion 26 are at least partially disposed adjacent to and in contact with an outer surface 28 of the non-conductive portion 24 and form a least a portion of an exterior 29 of the tubing segment 20.

In various embodiments, the non-conductive portion 24 can be constructed from one of the non-conductive or low conductive materials as described herein. In some embodiments, the non-conductive portion 24 can be formed from a fluoropolymer. In one exemplary embodiment, the non-conductive portion 24 can be formed from perfluoroalkoxy alkane (PFA). The conductive stripes 26a, 26b, 26c, 26d defining the conductive portion 26 can be bonded to and uniform with an outer surface 28 of the non-conductive portion 24, and can be constructed from a conductive polymeric material such as those conductive polymeric materials described herein. In some embodiments, the conductive portion is constructed from a fluoropolymer filed with a conductive material and, more particularly, in certain embodiments, a PFA filled with a conductive material. The conductive material used to fill the PFA can include, but is not limited to, carbon fiber, with nickel coated graphite, carbon fiber, carbon powder, carbon nanotubes, metal particles, and steel fiber.

Figure 3:
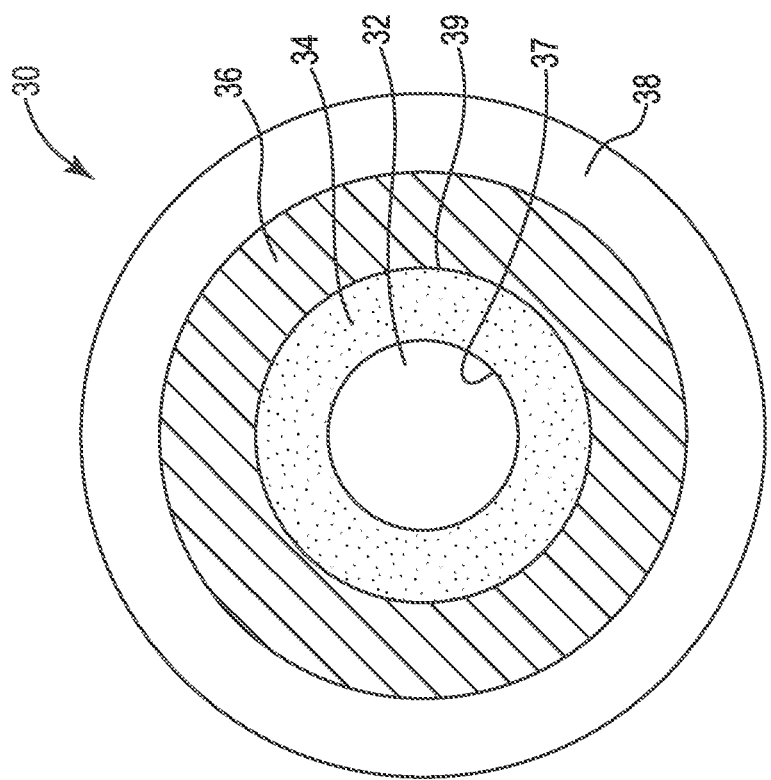
FIG. 3 is a cross-sectional view of an ESD mitigation tubing having a porous interior non-conductive polymer surface, a conductive polymer core, and an exterior polymer layer of this disclosure.

FIG. 3 is a cross-sectional view of an ESD mitigation tubing segment 30 according to yet another embodiment of the disclose. Like tubing segment 20 illustrated in FIG. 2, tubing segment 30, shown in FIG. 3, is partially conductive. Tubing segment 30 defines an interior fluid passageway 32 and includes non-conductive portion 34, a conductive portion 36, and an exterior portion 38. In some embodiments, the non-conductive portion 34, the conductive portion 36, and the exterior portion 38 are formed as individual layers. In some cases, the layers can be co-extruded.

In some embodiments, the non-conductive portion 34 is at least partially porous and defines a porous, non-conductive interior surface 37 of the tubing segment 30. In some embodiments, the non-conductive portion 34 is a foam layer, a perforated layer, a layer comprising apertures, or a layer comprising charge transfer conduits. The non-conductive portion 34 can be constructed from one of the non-conductive or low conductive materials as described herein. In some embodiments, the non-conductive portion 34 can be formed from a fluoropolymer. In one exemplary embodiment, the non-conductive portion 34 can be formed from perfluoroalkoxy alkane (PFA).

The conductive portion 36 can be disposed adjacent to and in contact with an outer surface 39 of the non-conductive portion 34 such that the conductive portion 36 extends along a length of the tubing segment 30 in a direction along its longitudinal axis. The conductive portion 36 can be provided as one or more layers and can be constructed from a conductive material such as those conductive materials described herein. In some embodiments, the conductive portion 36 is constructed from a fluoropolymer filed with a conductive material and, more particularly, in certain embodiments, a PFA filled with a conductive material. The conductive material used to fill the PFA can includes, but is not limited to, carbon fiber, with nickel coated graphite, carbon fiber, carbon powder, carbon nanotubes, metal particles, and steel fiber.

The exterior portion 38 can be formed from a non-conductive polymer that is the same or different than what is used to form either the non-conductive portion 34 or the conductive portion 36. In some cases, the exterior portion 38 is also partially conductive.

The various portions 34, 36, and 38 can be formed by sequentially extruding one portion over the other. In one embodiment, at least two of the portions can be co-extruded together depending on the materials selected for each portion.

Figure 4:
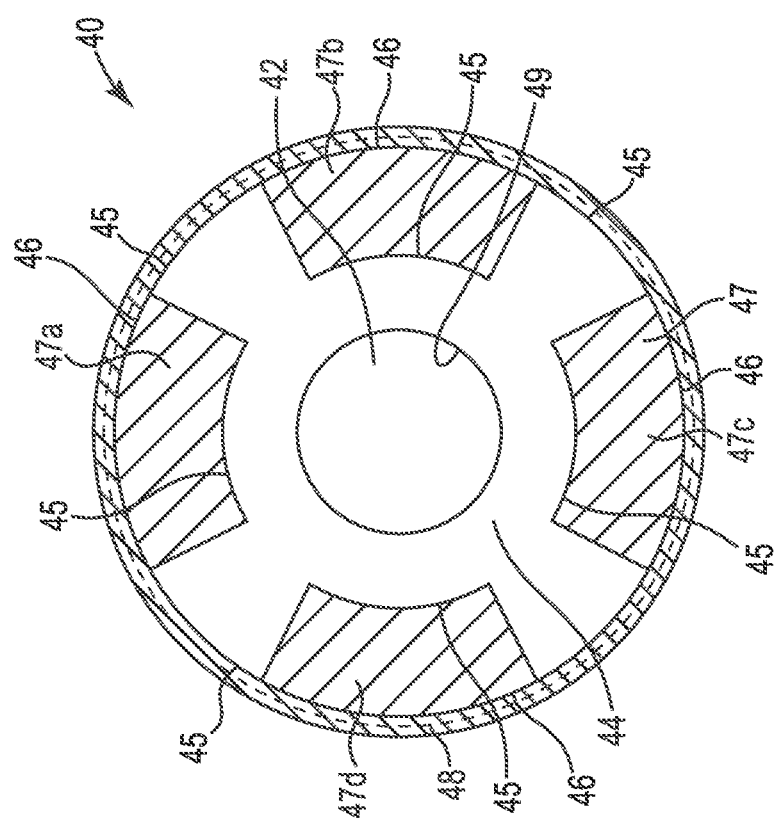
FIG. 4 is a cross-sectional view of an ESD mitigation tubing having a porous non-conductive section, conductive polymer stripes, and an exterior polymer layer of this disclosure.

FIG. 4 is a cross-sectional view of an ESD mitigation tubing segment 40 according to yet another embodiment of the disclosure. As shown in FIG. 4, tubing segment defines an interior fluid passageway 42 and includes a non-conductive portion 44, a conductive portion 47 defined by conductive polymer stripes 47a, 47b, 47c, and 47d, and an exterior polymer layer 48. It is generally understood that the number of conductive polymer stripes 47a, 47b, 47c, and 47d can vary. The spacing between the conductive polymer stripes 47a, 47b, 47c, and 47d may also vary. In some embodiments, the non-conductive portion 44 is at least partially porous and defines a porous, non-conductive interior surface 49 of the tubing segment 40. The conductive polymer stripes 47a, 47b, 47c, and 47d defining the conductive portion 47 are at least partially disposed adjacent to and in contact with an outer surface 28 of the non-conductive portion 24 and extend along a length of the tubing segment 40 in a direction along its longitudinal axis.

In various embodiments, the non-conductive portion 44 can be constructed from one of the non-conductive or low conductive materials as described herein. In some embodiments, the non-conductive portion 44 can be formed from a fluoropolymer. In one exemplary embodiment, the non-conductive portion 44 can be formed from perfluoroalkoxy alkane (PFA). The conductive stripes 47a, 47b, 47c, and 47d defining the conductive portion 47 can be disposed adjacent to and in contact with a portion of the outer surface 45 of the non-conductive portion 44, and can be constructed from a conductive polymeric material such as those conductive polymeric materials described herein. In some embodiments, the conductive portion 47 is constructed from a fluoropolymer filed with a conductive material and, more particularly, in certain embodiments, a PFA filled with a conductive material. The conductive material used to fill the PFA can include, but is not limited to, carbon fiber, with nickel coated graphite, carbon fiber, carbon powder, carbon nanotubes, metal particles, and steel fiber.

The exterior portion 48 can be formed from a non-conductive polymer that is the same or different than what is used to form either the non-conductive portion 44 or the conductive portion 47. In some cases, the exterior portion 38 is also partially conductive. The exterior portion 48 is disposed adjacent to and in contact with at least a portion of the exterior surface 45 of the non-conductive portion and at least a portion of the exterior surface 46 of the conductive portion 47.

The various portions 44, 47, and 48 can be formed by sequentially extruding one portion over the other. In one embodiment, at least two of the portions can be co-extruded together depending on the materials selected for each portion.

Figure 5:
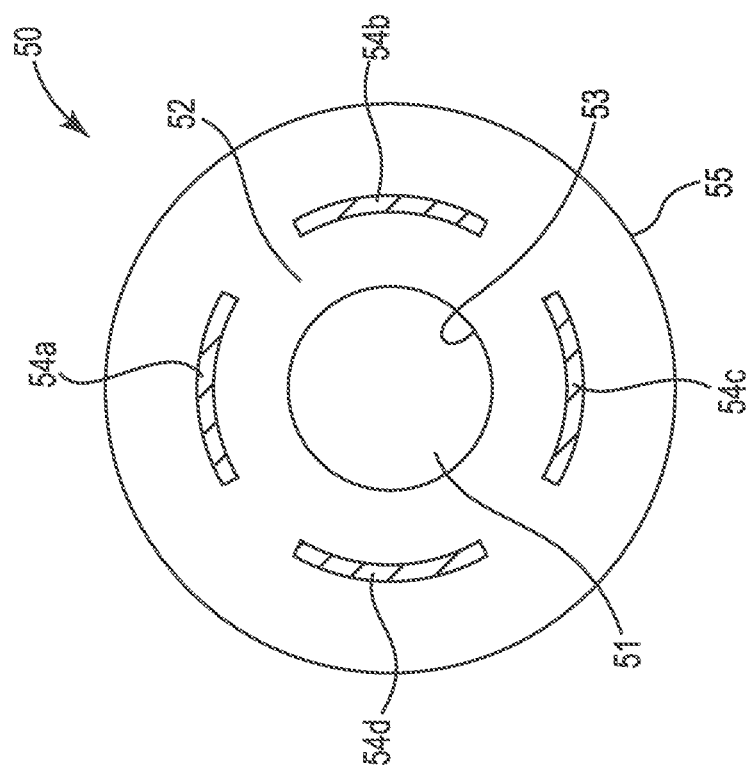
FIG. 5 is a cross-sectional view of an ESD mitigation tubing having a porous non-conductive section and interior conductive polymer stripes of this disclosure.

FIG. 5 is a cross-sectional view of an ESD mitigation tubing segment 50 according to still yet another embodiment of the disclosure. The tubing segment 50 defines an interior fluid passageway 51, a non-conductive portion 52, and a plurality of conductive polymer stripes 54a, 54b, 54c, and 54d embedded within the non-conductive portion 52 between an interior surface 53 and an exterior surface 55 of the tubing segment 50 and extending along a length of the tubing segment 50 in a direction along its longitudinal axis. It is generally understood that the number of conductive polymer stripes 54a, 54b, 54c, and 54d can vary. The spacing between the conductive polymer stripes 54a, 54b, 54c, and 54d may also vary. In some embodiments, as depicted, the conductive polymer stripes 54a, 54b, 54c, and 54d can be spaced an equal distance from one another about an outer circumference of the tubing segment 50. In other embodiments, a non-uniform spacing may exist between the conductive polymer stripes 54a, 54b. 54c, and 54d. In some embodiments, the non-conductive portion 52 is at least partially porous and defines a porous, non-conductive interior surface 53 of the tubing segment 50.

In various embodiments, the non-conductive portion 52 can be constructed from one of the non-conductive or low conductive materials as described herein. In some embodiments, the non-conductive portion 52 can be formed from a fluoropolymer. In one exemplary embodiment, the non-conductive portion 52 can be formed from perfluoroalkoxy alkane (PFA). The conductive stripes 54a, 54b, 54c, and 54d are embedded within the non-conductive portion 52 between an interior surface 53 and an exterior surface 55 of the tubing segment 50, and can be constructed from a conductive polymeric material such as those conductive polymeric materials described herein. In some embodiments, the conductive polymer stripes 54a, 54b, 54c, and 54d are constructed from a fluoropolymer filed with a conductive material and, more particularly, in certain embodiments, a PFA filled with a conductive material. The conductive material used to fill the PFA can include, but is not limited to, carbon fiber, with nickel coated graphite, carbon fiber, carbon powder, carbon nanotubes, metal particles, and steel fiber.

In some embodiments, the tubing segment 50 can also an outer conductive polymer layer in charge transfer contact with the one or more stripes of conductive polymer dispose within the non-conductive portion.

Fluid Circuit and Handling System

Figure 6:
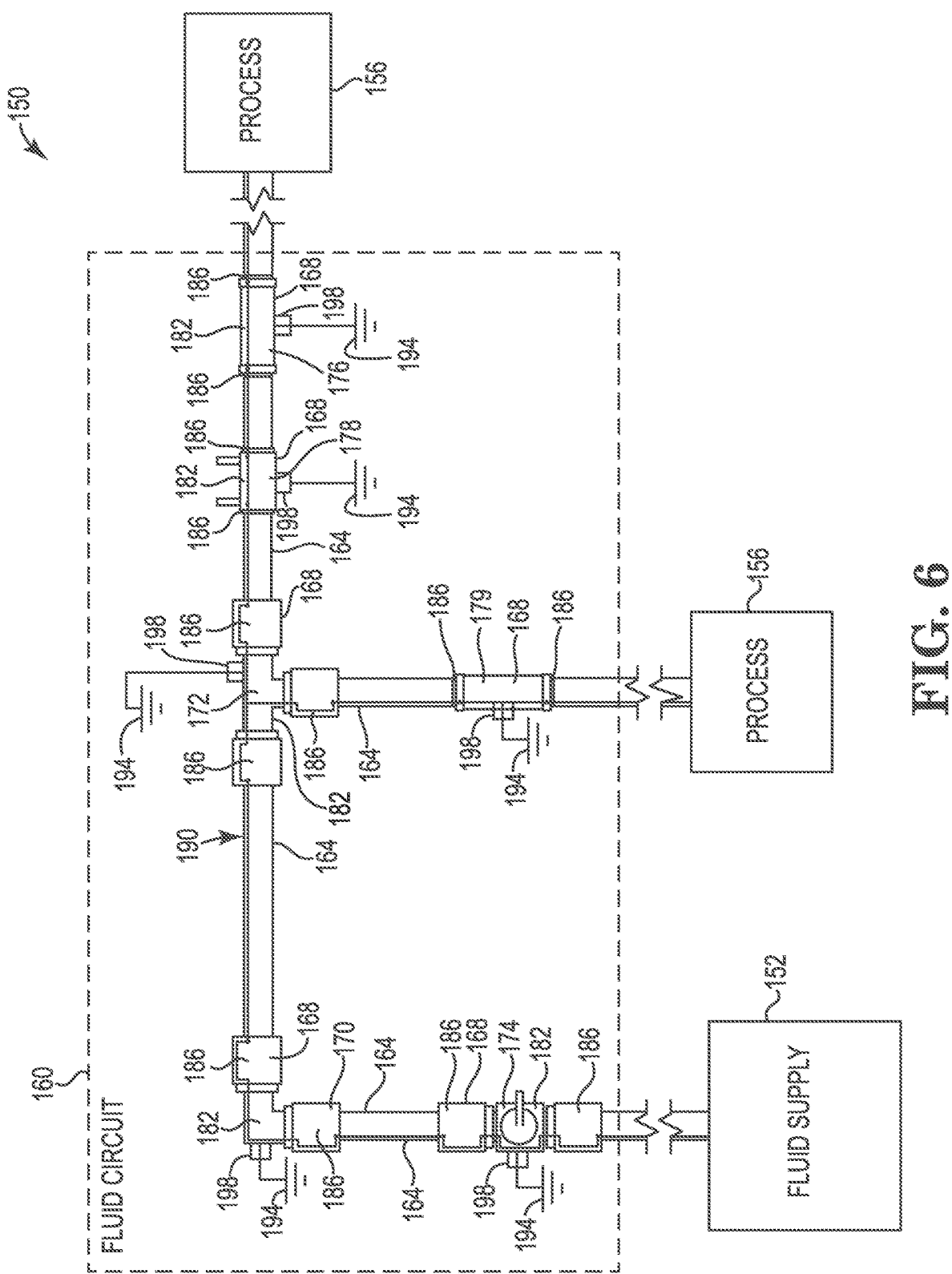
FIG. 6 is a schematic view of a fluid handling system that uses the ESD mitigation tubing of this disclosure.

FIG. 6 is a schematic view of a fluid handling system that incorporates any one of the ESD mitigation tubing segments 10, 20, 30, 40 or 50, described herein according to the various embodiments of the disclosure. FIG. 6 depicts a fluid handling system 150 according to one or more embodiments of the disclosure. The system 150 provides a flow path for fluid to flow from a fluid supply 152 to one or more process stages 156 positioned downstream of the source of fluid supply. System 150 includes a fluid circuit 160 which includes a portion of the flow path of the fluid handling system 150. The fluid circuit 160 includes tubing segments 164 and a plurality of operative components 168 that are interconnected via the tubing segments 164. In FIG. 6, the operative components 168 include an elbow shaped fitting 170. T-shaped fitting 172, a valve 174, filter 176, flow sensor 178, and straight fitting 179. However, in various embodiments the fluid circuit 160 can include additional or fewer operative components 168 in number and in type. For example, the fluid circuit 160 could substitute or additionally include pumps, mixers, dispense heads, sprayer nozzles, pressure regulators, flow controllers, degassers, purifiers, or other types of operational components.

In assembly, the operative components 168 are connected together by the plurality of tubing segments 164 connecting to the components 168 at their respective tubing connector fittings 186. Connected together, the plurality of tubing segments 164 and operative components 168 provide a fluid passageway through the fluid circuit 160 from the fluid supply 152 and toward the process stages 156. In certain embodiments, the operational components 168 each include a body portion 182 that defines fluid flow passageway and one or more tubing connector fittings 186. In some embodiments, at least one of the tubing connector fittings 186 is an inlet portion for receiving fluid into the body portion 182 and at least another one of the tubing connector fittings 186 is an outlet portion for outputting fluid received via the inlet portion. For example, T-shaped fitting 172 includes one tubing connector fitting 186 that is an inlet portion that receives fluid from the fluid supply 152 and two tubing connector fittings 186 which are outlet portions outputting fluid toward the process stages 156. In certain embodiments, the inlet portion and the outlet portion are each connected or connectable to a tubing segment 164. However, in some embodiments, for example where the operative components 168 in the fluid circuit 160 includes a spray nozzle, only the inlet portion is required to be connectable to a tubing segment 164. In some embodiments one or more of the operative components 168 includes a single tubing connector or fitting 179.

Each of the operative components 168, as illustrated in FIG. 6 includes a bridging component for conductively connecting the respective conductive pathway of the body portion 182 to the conductive portion of the tubing segments 164 that are connected to the operative components 168. As such, in certain embodiments the connected operative components 168 and tubing segments 164 form an electrical pathway along the entirety of the fluid circuit 160, eliminating breaks in conductivity between the tubing segments 160. In various embodiments, conductive materials have a resistivity level less than about $1 \times 10^{10}$ ohm-n, while non-conductive materials have a resistivity level greater than about $1 \times 10^{10}$ ohm-m. In certain embodiments, conductive materials have a resistivity level less than about $1 \times 10^{9}$ ohm-m, while non-conductive materials have a resistivity level greater than about $1 \times 10^{9}$ ohm-m.

In certain embodiments, to mitigate static charge buildup, one or more of the operative components 168 are electrically connected to ground 194 via one or more attachment fixtures 198. The ground attachment fixtures 198 continuously disperse static charges as they build up in the fluid circuit 160 by providing a pathway to ground 194 from the conductive pathway 190.

Operative Components

Operative components in this disclosure refer to any component or device having a fluid input and a fluid output and that connect with tubing for directing or providing for the flow of fluid. Examples of operative components include, but are not limited to, fittings, valves, filters, heat exchanges, sensors, pumps, mixers, spray nozzles, purifiers, degassers, and dispense heads. These and additional non-limiting examples of operative components are illustrated, for example, in U.S. Pat. Nos. 5,672,832; 5,678,435; 5,869,766; 6,412,832; 6,601,879; 6,595,240; 6,612,175; 6,652,008; 6,758,104; 6,789,781; 7,063,304; 7,308,932; 7,383,967; 8,561,855; 8,689,817; and 8,726,935, each of which are incorporated herein by reference, except for express definitions or patent claims contained in the listed documents.

The operative components may be constructed from conductive fluoropolymers including, for example, perfluoroalkoxy alkane polymer (PFA), ethylene and tetrafluoroethylene polymer (ETFE), ethylene tetrafluoroethylene and hexafluoropropylene polymer (EFEP), fluorinated ethylene propylene polymer (FEP), tetrafluoroethylene polymer (PTFE), polychlorotrifluoroethylene polymer (PCTFE), or other suitable polymeric materials. For example, in some embodiments the conductive fluoropolymers are PFA filled with conductive material (e.g. filled PFA). This filled PFA includes, but is not limited to, PFA filled with carbon fiber, nickel coated graphite, carbon fiber, carbon powder, carbon nanotubes, metal particles, and steel fiber. In various embodiments, conductive materials have a resistivity level less than about $1 \times 10^{10}$ ohm-n while non-conductive materials have a resistivity level greater than about $1 \times 10^{10}$ ohm-m. In certain embodiments, conductive materials have a resistivity level less than about $1 \times 10^{9}$ ohm-m while non-conductive materials have a resistivity level greater than about $1 \times 10^{9}$ ohm-m. When the disclosed fluid handling systems are configured for use in ultra-pure fluid handling applications, both the tubing segments and operational components are typically constructed from polymeric materials to satisfy purity and corrosion resistance standards.

Figure 7:
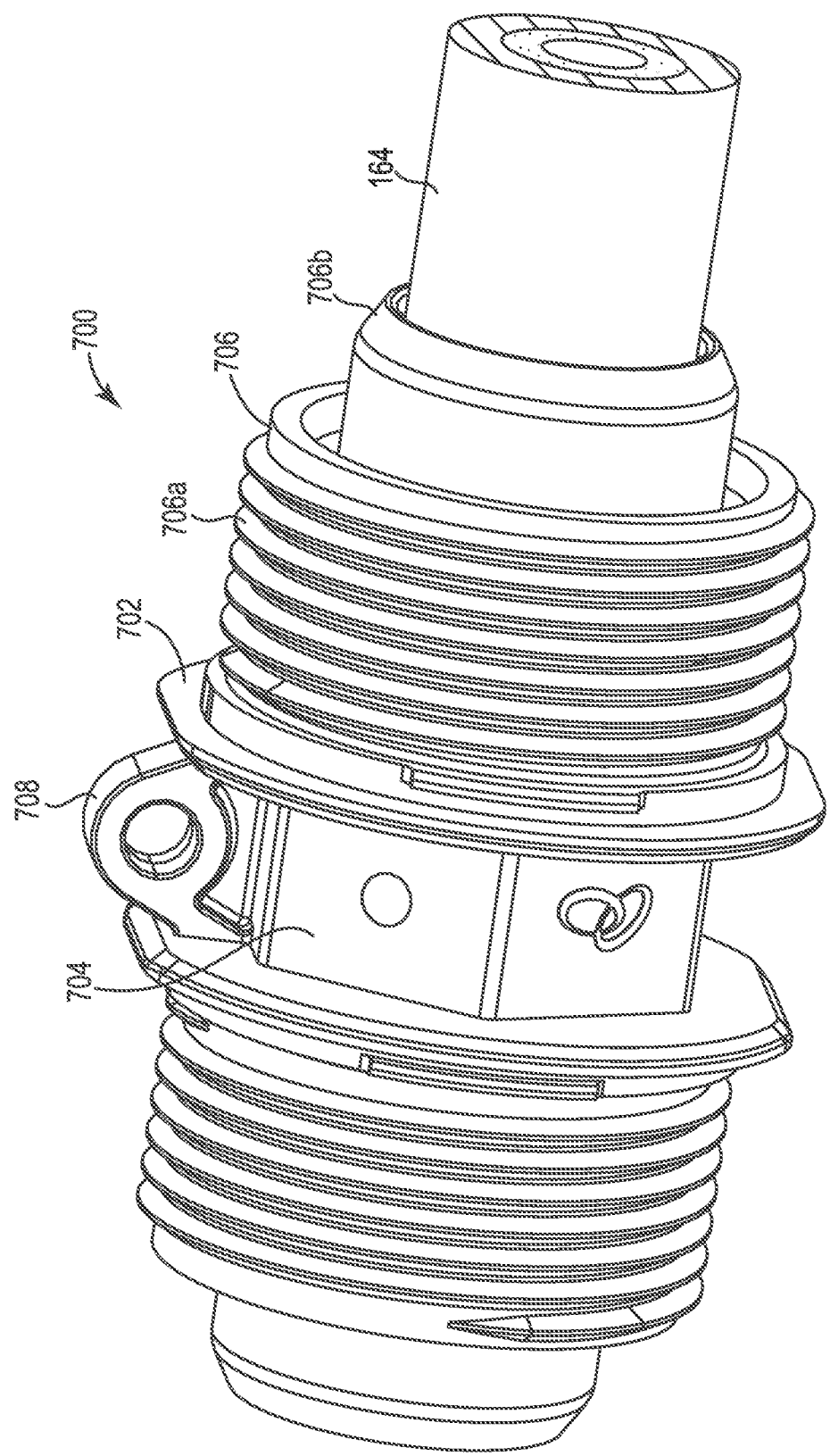
FIG. 7 is a perspective view of a two-way connector component that uses the ESD mitigation tubing of this disclosure.

FIG. 7 is a perspective view of a two-way connector component that uses the ESD mitigation tubing segments according to the various embodiments described herein. FIG. 7 illustrates a straight connector fitting 700 to connect two tubing segments. Connector fitting 700 includes a shoulder region 702 adjacent a body portion 704 of an operative component and extends outwardly to form a neck region 706, a threaded region 706a, and a nipple portion 706b. Tubing segment 164 is received by the nipple portion 706b, which, in certain embodiments, may be configured, for example, as a FLARETEK® fitting. Connector fitting 700 also includes an attachment feature 708 that is a conductive material that is conductively connected with the body portion 704 for attachment to an external electrical contact and then to ground. For example, attachment feature 708 can be connected to an electrical contact which is grounded in order to configure the operative component connector fitting 400 for ESD mitigation.

Figure 8:
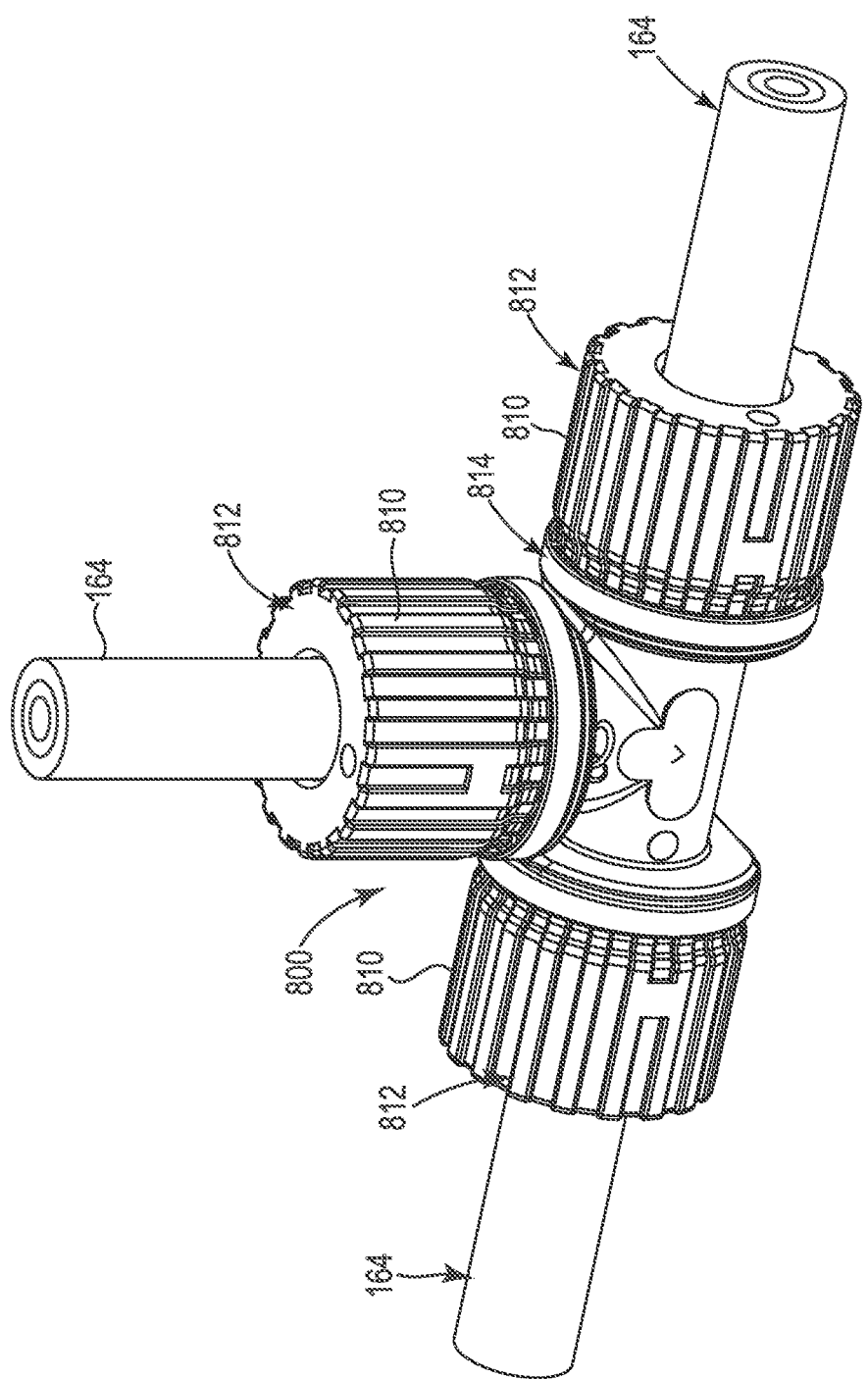
FIG. 8 is a perspective view of a three-way connector component that uses the ESD mitigation tubing of this disclosure.

FIG. 8 is a perspective view of a three-way connector component that uses the ESD mitigation tubing segments according to the various embodiments described herein. In the embodiment illustrated in FIG. 8, three-way connector fitting 800 includes a connector fitting nuts 810 for engaging to a threaded region of the connector to secure tubing segment 164. In some embodiments the fitting nut may be, for example, a compression nut. As the fitting nut 810 is rotated and tightened onto the threaded region, tubing segment 164 engages the connector fitting so that the tubing conductively connects the conductive portion to nipple portion, as well as forming a leak-proof seal between the tubing and the connector fitting. In one or more embodiments, fitting nut 810 has a generally cylindrical shape having an interior surface including threads for mating with the threaded region. In addition, fitting nut 810 may have a structured outer surface such as, for example, ribs 812, where the ribs are symmetrically disposed about the exterior surface for mating with a wrench or locking device for tightening or loosening of the fitting nut 810 on the threaded region of the connector.

In one or more embodiments, the fitting nut 810 is constructed from a polymeric material. For example, in certain embodiments the fitting nut 810 is constructed from PFA, polyaniline, or other suitable polymers.

In some embodiments, the connector fitting 800 is a conductive polymer material, such as carbon-filled PFA, or other suitable conductive polymer, that is formed, for example, using conventional molding processes.

In certain embodiments, when the connector fitting 800 is assembled with tubing segment 164, the fitting nut 810 contacts the exterior surface of tubing segment 164 at the nipple forward portion and forms a continuous fluid passageway between tubing segment 164 and connector fitting 800. When the fitting nut 810 is rotated and tightened, connection verification ring 814 positioned between the fitting nut 810 and the shoulder portion contacts both the exterior surfaces of the fitting nut and shoulder portion to provide a leak-proof connection.

In various embodiments, the connection verification ring 814 is constructed from polymeric material, such as PFA, or other polymers or elastomers.

Figure 9:
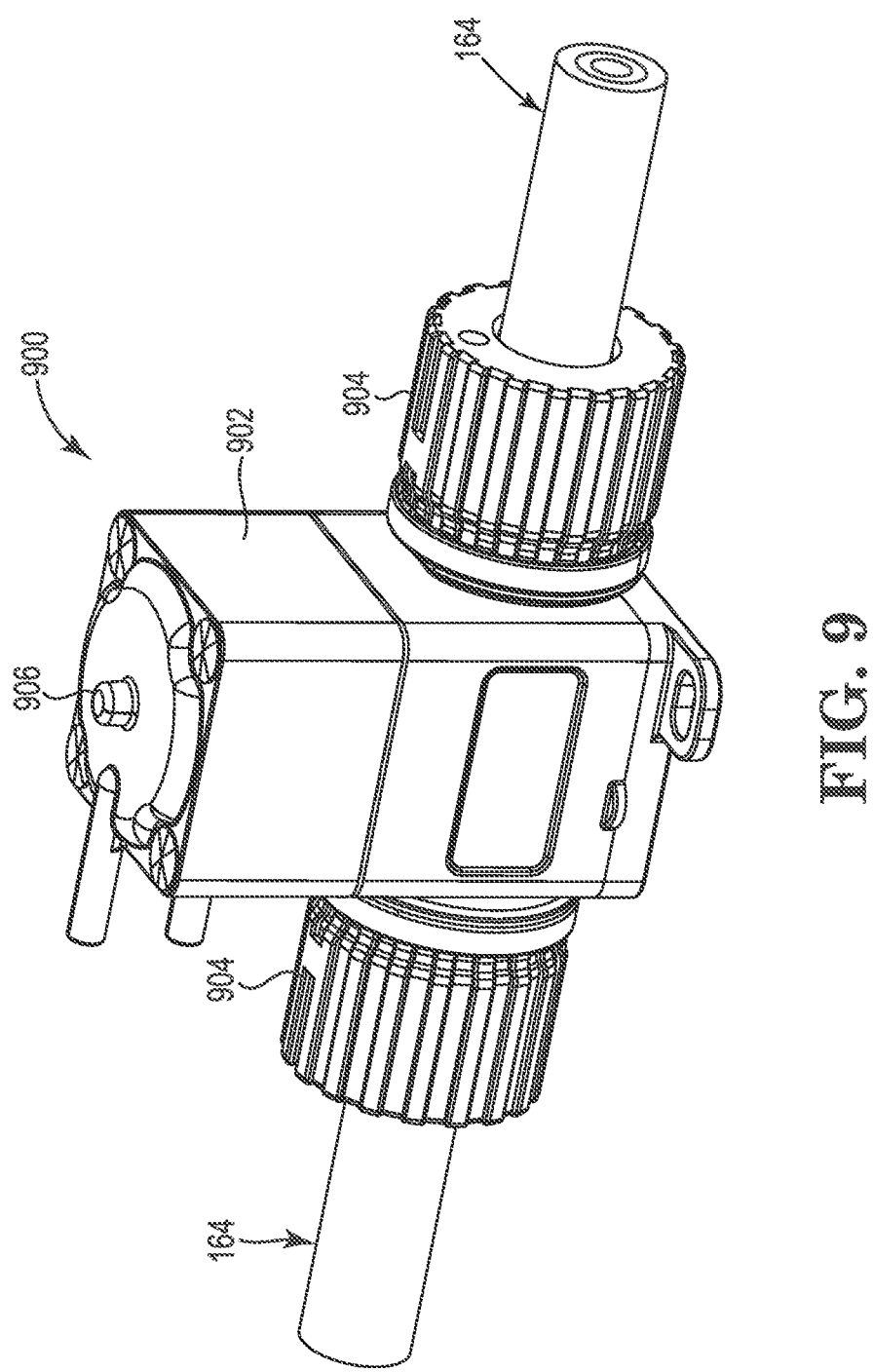
FIG. 9 is a perspective view of valve component that uses the ESD mitigation tubing of this disclosure.

FIG. 9 is perspective view of a valve component 900 that uses the ESD mitigation tubing segments according to the various embodiments described herein. Operative component 900 includes a body portion 902, tubing connector fittings, and fitting nuts 904. In one or more embodiments, the operative component 900 additionally includes an operative valve element 906 in the body portion. The operative element 900, in various embodiments, broadly includes suitable structure, electronics, or other materials for configuring the operative component 900 to perform various operations.

The body portion 902 includes conductive PFA that extends between each of the tubing connector fittings 904 and forms electrical contact between each of the tubing connector fittings and the conductive portions of tubing segments 164, respectively.

Those of skill in the art will appreciate that, while the specific embodiments illustrated in FIGS. 8 and 9 have identical connector fittings, in certain embodiments, the connector fittings may have varying sizes, may have various designs, such as step-down or step-up fittings, or may be located on various types of operative components. For example, in some embodiments, the operational component may be a mixer, sensor, filter, pump, heat exchanger or other suitable element. As such, the operative component is configurable to perform various processes or tasks within a fluid circuit.

The descriptions of the various embodiments of the disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. An electrostatic discharge mitigation tubing segment comprising a porous non-conductive interior surface and a conductive portion, wherein adjacent conductive portion is configured to transfer electrostatic charge generated by a charged fluid passing through the tubing segment to ground such that electrostatic discharge can be mitigated,
wherein the porous, non-conductive interior surface is defined by a non-conductive polymer portion and the conductive portion comprises one or more stripes of conductive polymer embedded within the non-conductive portion between an interior surface and an exterior surface of the tubing segment, and
further comprising an outer conductive polymer layer in charge transfer contact with the one or more stripes of conductive polymer.

2. The electrostatic discharge mitigation tubing segment of claim 1, wherein the porous interior surface is a foam layer, a perforated layer, a layer comprising apertures, or a layer comprising charge transfer conduits.

3. The electrostatic discharge mitigation tubing segment of claim 1, wherein the interior non-conductive surface is a perforated layer of non-conductive polymer and the conductive portion comprises a layer of conductive polymer disposed over and in contact with the perforate layer.

4. The electrostatic discharge mitigation tubing segment of claim 3, wherein the non-conductive polymer comprises a fluoropolymer, and the conductive polymer comprises the perfluoropolymer filled with a conductive material.

5. The electrostatic discharge mitigation tubing segment of claim 4, wherein the perfluoropolymer is perfluoroalkoxy alkane (PFA).

6. The electrostatic discharge mitigation tubing segment of any one of claims 1-5, further comprising an outer layer.

7. The electrostatic discharge mitigation tubing segment of claim 1, wherein the porous, non-conductive interior surface is defined by a non-conductive polymer portion and the conductive portion comprises one or more stripes of conductive polymer disposed adjacent to and in contact with an outer surface of the non-conductive portion, the one or more conductive polymer stripes extending a long a length of the tubing segment in a direction along a longitudinal axis.

8. The electrostatic discharge mitigation tubing segment of claim 7, further comprising an outer layer.

9. The electrostatic discharge mitigation tubing segment of claim 7, wherein the conductive stripes comprise a fluoropolymer filled with a conductive material.

10. The electrostatic discharge mitigation tubing segment of claim 9, wherein the non-conductive portion comprises a fluoropolymer.

11. The electrostatic discharge mitigation tubing segment of claim 10, wherein the porous interior surface comprises apertures, holes, channels, fluid passages, or charge transfer conduits.

12. A fluid circuit for a predetermined fluid flow passageway having at least one inlet and at least one outlet, the fluid circuit comprising:
a plurality of electrostatic discharge mitigation tubing segments according to any one of claim 1 or 7 and a plurality of operative components, each operative component comprising a body portion with an internal fluid flow passageway and a plurality of tubing connector fittings, the operative components connecting the plurality of tubing segments at selected tubing connector fittings, the plurality of tubing segments and operative components providing the fluid flow passageway through the fluid circuit;
wherein each tubing segment comprises i) a non-conductive portion defining the fluid passageway and ii) one or more conductive portions of conductive fluoropolymer extending axially to ends of each of the respective tubing segments, and
wherein each operative component body portion comprises a conductive fluoropolymer that extends between each of the plurality of tubing connector fittings, and
wherein each of the tubing connector fittings conductively connects the respective conductor of the body portion to the one or more interior conductive stripes of the tubing segment.

13. The fluid circuit of claim 12, wherein the plurality of operative components includes any one of a valve, a straight connector, a T-connector, an elbow connector, a multi-connector manifold, a filter, a heat exchanger, or a sensor.

* * * * *